United States Patent [19]

Koushima et al.

[11] Patent Number: 5,665,795
[45] Date of Patent: Sep. 9, 1997

[54] RESIN COMPOSITIONS AND MOLDED ARTICLES

[75] Inventors: Yuji Koushima, Yokohama; Teiji Kohara, Kawasaki; Tadao Natsuume, Yokosuka, all of Japan

[73] Assignee: Nippon Zeon Co., Ltd., Tokyo, Japan

[21] Appl. No.: 464,629

[22] PCT Filed: Feb. 28, 1994

[86] PCT No.: PCT/JP94/00318

§ 371 Date: Jun. 26, 1995

§ 102(e) Date: Jun. 26, 1995

[87] PCT Pub. No.: WO94/20575

PCT Pub. Date: Sep. 15, 1994

[30] Foreign Application Priority Data

Mar. 1, 1993 [JP] Japan ................... 5-064743
Jun. 8, 1993 [JP] Japan ................... 5-164060

[51] Int. Cl.⁶ .................. C08K 7/18; C08K 7/20
[52] U.S. Cl. .................. 523/223; 523/220; 524/493; 524/494; 524/495; 524/496; 524/497; 524/554
[58] Field of Search ................... 524/493, 494, 524/496, 495, 497, 554; 523/220, 223

[56] References Cited

U.S. PATENT DOCUMENTS 3,991,139  11/1976  Kokuryo et al. ................... 524/222

FOREIGN PATENT DOCUMENTS 51-92860    8/1976   Japan ................... 524/425
1-502033    7/1989   Japan .
4-365606   12/1992   Japan .
2 028 344   3/1980   United Kingdom .
WOA8701070  2/1987   WIPO .

OTHER PUBLICATIONS

Database WPI, Derwent Publications Limited, London, GB; AN 94–039902.

*Primary Examiner*—Veronica P. Hoke
*Attorney, Agent, or Firm*—Armstrong, Westerman, Hattori, McLeland & Naughton

[57] ABSTRACT

A resin composition comprising 30–95 parts by weight of a thermoplastic norbornene resin and 5–70 parts by weight of a spherical inorganic filler having an average particle diameter of 0.05–50 µm; and a precision molding produced therefrom.

16 Claims, No Drawings

RESIN COMPOSITIONS AND MOLDED ARTICLES

This application is the national stage application under 35 USC §371 of International Application No. PCT/JP94/00318, filed Feb. 28, 1994, which claims the priority of Japanese Patent Application No. 05-64743 filed Mar. 1, 1993, and Japanese Patent Application No. 05-164060, filed Jun. 8, 1993.

TECHNICAL FIELD

The present invention relates to resin compositions excellent in moldability and molded articles obtained therefrom which are excellent in dimensional stability and surface precision against environmental changes such as temperature and humidity.

BACKGROUND ART

Attempts to use resins as materials for precision molded articles have been increasingly made. However, since resins generally have a high linear expansion coefficient, they are apt to undergo dimensional change owing to change in environmental temperatures and furthermore, when molded into articles of thick wall, considerable shrinkage occurs, and thus, they have many problems as materials for precision molded articles.

Recently, thermoplastic norbornene resins excellent in heat resistance and moisture resistance have been noticed as molding materials in various fields. Thermoplastic norbornene resins can be precision molded and are superior in dimensional stability against change of humidity, but like other resins, have a high linear expansion coefficient. Therefore, they have problems in dimensional stability against temperature change and cannot be used as materials for precision molded articles used in an environment where temperatures are apt to change. Furthermore, even if precision molding is possible, shrink marks have sometimes been formed.

In order to decrease linear expansion coefficient and inhibit formation of shrink marks, it has been attempted to add inorganic fillers to thermoplastic norbornene resins, but when inorganic fillers are added, there are problems that flowability decreases to cause deterioration in moldability and furthermore, transferability of mold configuration to the surface of molded articles deteriorates and smoothness of the surface of the molded articles lowers.

DISCLOSURE OF INVENTION

The inventors have found that when a specific spherical inorganic filler is added to thermoplastic norbornene resins, there can be obtained resin compositions excellent in moldability and molded articles excellent in surface precision and dimensional stability against environmental changes such as change of temperature and humidity. Thus, the present invention has been accomplished.

That is, the present invention provides a resin composition comprising 30–95 parts by weight of a thermoplastic norbornene resin and 5–70 parts by weight of a spherical inorganic filler having an average particle diameter of 0.05–50 μm and a molded article obtained therefrom.

BEST MODE FOR CARRYING OUT THE INVENTION

The present invention will be explained below.

Thermoplastic Norbornene Resin

The thermoplastic norbornene resins used in the present invention are resins known in JP-A-3-14882, 3-12213.7 and 4-63807, and examples thereof are ring opening polymers of norbornene monomers and hydrogenation products thereof, addition polymers of norbornene monomers, addition polymers of norbornene monomers and olefins, and modification products of these polymers.

The norbornene monomers are also known monomers in the above patent publications and JP-A-2-227424, 2-276842, etc. Examples are norbornene and alkyl-, alkylidene or aromatic-substitution derivatives thereof, and these substituted and unsubstituted olefins which are substituted with polar groups such as halogen, hydroxyl group, ester group, alkoxy group, cyano group, amide group, imide group and silyl group, for example, 2-norbornene, 5-methyl-2-norbornene, 5,5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene, etc.; monomers of polycyclic structure which are monomers of cyclopentadiene and derivatives and substitution products thereof similar to those referred to hereabove, for example, dicyclopentadiene, 2,3-dihydrodicyclopentadiene, 1,4:5,8-dimethano-1,2,3,4,4a,5,8,8a-octahydro-2,3-cyclopentadienonaphthalene, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 1,4:5,10:6,9-trimethano-1,2,3,4,4a,5,5a,6,9,9a,10,10a-dodecahydro-2,3-cyclopentadienoanthracene, etc.; addition products of cyclopentadiene and tetrahydroindene, etc. and derivatives and substitution products thereof similar to those referred to hereabove, for example, 1,4-methano-1,4,4a,4b,5,8,8a,9a-octahydrofluorene, 5,8-methano-1,2,3,4,4a,5,8,8a-octahydro-2,3cyclopentadienonaphthalene, etc.; etc.

Polymerization of the norbornene monomers can be carried out by known processes and, if necessary, they can be made to thermoplastic saturated norbornene resins by copolymerizing with other copolymerizable monomers or by hydrogenation. The thermoplastic saturated norbornene resins are thermoplastic norbornene resins having substantially no unsaturated bond in the main chain structure and are superior to other thermoplastic norbornene resins in light stability and weather resistance. The addition polymers of norbornene monomers and addition polymers of norbornene monomers and olefins have no unsaturated bond in the main chain structure while since the ring opening polymers of norbornene monomers have an unsaturated structure in the main chain structure, they can be converted to those having substantially no unsaturated structure in the main structure by hydrogenation and thus, can be converted to thermoplastic saturated norbornene resins. Furthermore, the polymers or hydrogenation products thereof may be modified with α,β-unsaturated carboxylic acids and/or derivatives thereof, styrenic hydrocarbons, organosilicon compounds having an olefinic unsaturated bond and a hydrolyzable group, unsaturated epoxy monomers or the like. Thermoplastic norbornene resins containing no polar group are preferred for obtaining compositions excellent in moisture resistance and chemical resistance.

Molecular weight is suitably 10,000–200,000 in terms of number-average molecular weight measured by GPC (gel permeation chromatography) analysis using cyclohexane as a solvent for giving excellent moldability and sufficient strength. Moreover, when the ring opening polymers of norbornene monomers are hydrogenated, at least 90%, preferably at least 95%, more preferably at least 99% of the unsaturated bonds in the main chain structure are saturated to improve light stability and weather resistance.

Filler

The fillers used in the present invention are spherical and preferably close to true sphere. They are inorganic particles having an average particle diameter of 0.05–50 μm, preferably 0.1–10 μm, more preferably 0.2–5 μm. Furthermore, those which are small in particle diameter distribution are preferred, and particles having the size in the range of ⅓–2 times the average particle diameter occupy at least 70% by weight, preferably at least 80% by weight, more preferably at least 85% by weight, especially preferably at least 90% by weight. Moreover, at least 70%, preferably at least 80%, more preferably at least 90% of the total particles have a ratio of short diameter/long diameter of preferably at least 0.6, more preferably at least 0.8, especially preferably at least 0.9. The long diameter here means the longest diameter of a particle and the short diameter means the shortest diameter of the particle. The particle diameter of a particle is the long diameter. The short diameter, the long diameter and the average particle diameter can be measured on the basis of the images of microphotographs and the term "spherical" means that at least 80%, preferably at least 90%, more preferably at least 95% of the total particles in the images of microphotographs of the particles are not angular. It is normally difficult to obtain such spherical particles only by grinding a mass to fine particles, and a treatment to make spherical is necessary depending on the kind of material. For example, in the case of the material of the particles being silica, amorphous silica is water-ground to prepare a particulate silica suspension, the suspension is sprayed in a stream of hot air by spray drying method to make spherical particles and the resulting spherical silica particles are fired to obtain a spherical filler (JP-A-4-31311).

With the shape of the particles deviating from true sphere, namely, with decreasing of the ratio of short diameter/long diameter, melt viscosity of the resin composition increases and moldability deteriorates and further the surface precision decreases. When the particle diameter is too small, melt flowability of the resin composition at the time of molding is inferior and when the particle diameter is too large, dimensional stability of the molded articles against change of temperature is inferior and the surface precision of the molded articles deteriorates. Furthermore, when the distribution of particle diameter is wide, the surface precision of a part of the molded articles is sometimes inferior and compositions of uniform properties cannot be sometimes obtained even if average particle diameter is small.

Material of the filler is not limited as far as it is a solid inorganic compound. As examples, mention may be made of talc, calcium carbonate, aluminum hydroxide, magnesium hydroxide, calcium sulfate, barium sulfate, metal oxides (such as zinc oxide, magnesium oxide, iron oxide, titanium oxide, alumina and antimony trioxide), double salts (such as alum and clay), silica, quartz, glass, kaolin, wollastonite, mica, carbon black and molybdenum sulfide. Among them, silica, quartz and glass are preferred.

Resin Composition

The resin composition of the present invention contains the thermoplastic norbornene resin in an amount of 30–95 parts by weight, preferably 40–90 parts by weight, more preferably 50–80 parts by weight and the filler in an amount of 5–70 parts by weight, preferably 10–60 parts by weight, more preferably 20–50 parts by weight. If amount of the filler is too small, shrink marks are sometimes formed at the molding and further, dimensional change due to the change of environmental temperature is great after molding. If amount of the filler is too large, melt flowability is low and moldability deteriorates. The melt index of thermoplastic norbornene resins which indicates melt flowability is generally about 25–35 g/min at 280° C. while the melt index of the resin composition of the present invention at 280° C. is lower only about 1–7 g/min than that of the thermoplastic norbornene resins before the filler is added thereto and substantially no influence is given to the moldability.

If necessary, the resin composition of the present invention may contain various additives, for example, antioxidants such as those of phenolic type and phosphorus type; heat deterioration inhibitors such as those of phenolic type; ultraviolet absorbers such as those of benzophenone type; antistatic agents such as those of amine type; and lubricants such as esters of aliphatic alcohols and partial esters and partial ethers of polyhydric alcohols. Furthermore, other resins may be added as far as the object of the present invention is not damaged.

Blending

The resin composition of the present invention can be obtained by blending the thermoplastic norbornene resin and the inorganic filler and optionally the additives. Blending method is not limited as far as the inorganic filler and the additives are sufficiently dispersed in the resin. For example, there are a method of melt kneading the resin at high temperatures by single-screw extruder, multi-screw extruder, Banbury mixer, kneader, mixing roll, etc. and a method of dissolving the resin in a suitable solvent and carrying out dispersing, followed by removing the solvent by solidification or drying.

Molding

The method for molding the resin composition of the present invention is not limited. Injection molding, blow molding, injection blow molding, rotational molding, vacuum-forming, extrusion molding, hot pressing, calendering, casting, etc. can be employed depending on the purposes.

Molded Article

The molded article of the present invention is excellent in dimensional stability. Molded articles of thermoplastic norbornene resins have a linear expansion coefficient of about $6 \times 10^{-5}$–$8 \times 10^{-5}$ deg$^{-1}$ while the molded articles of the resin compositions of the present invention which comprise a thermoplastic norbornene resin and a specific filler usually have a linear expansion coefficient of about $3 \times 10^{-5}$–$6 \times 10^{-5}$ deg$^{-1}$ and sometimes have a linear expansion coefficient of about $1 \times 10^{-5}$ deg$^{-1}$.

Furthermore, the molded articles of the present invention are excellent in surface precision. When a mold the inner surface of which is polished and mirror-finished is used, the surface precision of the resulting molded articles made by injection molding a thermoplastic norbornene resin is about 0.1–0.2 μm in terms of the maximum height Rmax value and in the case of using a resin to which a common filler is added, the maximum height Rmax value is sometimes greater than the above value. However, when the resin composition of the present invention containing the specific filler is used, the resulting molded articles have a surface precision similar to that of the articles containing no fillers.

As the molded articles of the present invention, mention may be made of sealants for electronic devices such as transistors, IC, LSI, LED, CCD and photocouplers and parts thereof; sealing materials for electric parts such as motors, condensers, switches and sensors; materials for parts such as connectors for electric wires and for optical communication; coil bobbin materials; coating materials for electric wires and cables; household and industrial electronic equipments; OA equipments such as copying presses, printers and computers; general insulating materials and body materials for instruments; structural members of parabolic antennas, flat antennas and radar domes; photosensitive drum materials for copying presses and printers; optical materials such as optical lenses, optical mirrors, prisms and light diffusion plates; information recording medium substrates such as information discs, information cards and information films; circuit boards such as hard printed circuit boards, flexible printed circuit boards and multilayer printed wiring boards, especially used for large computers, mobile communication equipments and satellite communication equipments which require high-frequency characteristics; pipe arranging materials such as piping, joints, valves, pipes, tubes, shippers, flowmeters, filters and pumps; containers for treatment or transfer such as tanks, trays, carriers and cases; containers for chemicals for treatment of electronic parts such as sampling containers, bottles, ampoules and bags; containers for liquid, solid and powdery medicines such as containers for liquid medicine for injection, vials, ampoules, prefilled syringes, bags for infusion, solid medicine containers and eye lotion containers, containers for medical samples, and caps of these containers; sterilization containers used for sterilization of medical equipments such as injectors, surgical knives, gauzes and contact lenses, artificial organs such as denture-bases, heart machines, artificial dental roots, and materials for parts thereof.

EXAMPLE

The present invention will be explained in detail by the following reference examples, examples and comparative examples. The inner surface of the mold used for molding a plate was polished and mirror-finished.

REFERENCE EXAMPLE 1

Melt index of pellets of thermoplastic saturated norbornene resin (ZEONEX 280 manufactured by Nippon Zeon Co., Ltd.; glass transition temperature: about 140° C.; number-average molecular weight: about 28,000; a hydrogenation product of ring opening polymer of norbornene monomer; and hydrogenation rate of main chain structure: at least 99.7%) was measured in accordance with JIS K6719 to obtain 28 g/min.

The pellets were subjected to injection molding at a resin temperature of 300° C. and a mold temperature of 100° C. to make a column A-0 having a diameter of 5 mm and a height of 5 mm and twenty plates B-0 of 1 mm×100 mm×60 mm. Among the twenty plates B, eight plates had shrink marks. Linear expansion coefficient of the column A was measured by a thermo mechanical analyzer to obtain $7 \times 10^{-5}$ $\deg^{-1}$. The maximum height Rmax of the surface of the plate B was 0.12 μm at maximum and 0.11 μm at minimum on the whole surface.

EXAMPLE 1

A mixture of 100 parts by weight of the thermoplastic saturated norbornene resin (ZEONEX 280) and 40 parts by weight of a synthetic quartz true sphere filler (ADOMAFINE SO-C2 manufactured by Tatsumori Co., Ltd., 95% by weight or more of the particles having a particle diameter of 0.10–1.00 μm) was kneaded by a twin-screw extruder of 35 mm in diameter (TEM 35B manufactured by Toshiba Machine Co., Ltd.) at a resin temperature of 250° C. and pelletized by a pelletizer. Melt index at 280° C. was measured in accordance with JIS K6719 to obtain 23 g/min.

0.1 g of the filler was added to 100 g of methanol and the mixture was stirred to well disperse the filler. This dispersion was dropped on the grid of a transmission type electron microscope and methanol was evaporated, and a photograph of ×5000 was taken by the transmission type electron microscope. Only the particles having a particle diameter of 0.08–1.35 μm were seen in the image of this photograph. The ratio of short diameter/long diameter of 30 particles present around the center of the photograph except for the overlapping particles was measured. The smallest was 0.93 and they had a particle diameter (long diameter) of 0.28–0.66 μm.

Using the above pellets, column A-1 and twenty plates B-1 were molded in the same manner as in Reference Example 1. Linear expansion coefficient of A-1 was measured to obtain $3.5 \times 10^{-5}$ $\deg^{-1}$. No shrink marks were seen in the twenty plates B-1. The maximum height Rmax of the surface of the plates B-1 was 0.15 μm at maximum and 0.11 μm at minimum on the whole surface.

EXAMPLE 2

Pellets were molded in the same manner as in Example 1 except for using a synthetic quartz true sphere filler having an average particle diameter of 1.0 μm (ADOMAFINE SO-C2, 95% by weight or more of the particles having a particle diameter of 0.20–2.00 μm, manufactured by Tatsumori Co., Ltd.) as the filler. Melt index at 280° C. was measured in accordance with JIS K6719 to obtain 25 g/min.

In the same manner as in Example 1, a microphotograph of ×5000 of the filler was taken by a transmission type electron microscope. Only the particles having a particle diameter of 0.32–2.17 μm were seen in the image of this photograph. The ratio of short diameter/long diameter of 30 particles present around the center of the photograph except for the overlapping particles was measured. The smallest was 0.91, and 29 particles had a particle diameter (long diameter) of 0.32–1.89 μm and one particle had 2.03 μm using the above pellets, column A-2 and twenty plates B-2 were molded in the same manner as in Reference Example 1. Linear expansion coefficient of A-2 was measured to obtain $3.3 \times 10^{-5}$ $\deg^{-1}$. No shrink marks were seen in the twenty plates B-2. The maximum height Rmax of the surface of the plates B-2 was 0.18 μm at maximum and 0.11 μm at minimum on the whole surface.

COMPARATIVE EXAMPLE 1

Pellets were molded in the same manner as in Example 1 except for using a high purity fused quartz glass filler (FUSEREX RD-120 manufactured by Tatsumori Co., Ltd. having an average particle diameter of about 30 μm, ground type and non-sphere). Melt index at 280° C. was measured in accordance with JIS K6719 to obtain 16 g/min.

In the same manner as in Example 1, a microphotograph of ×5000 of the filler was taken by a transmission type electron microscope. 40% or more of the particles had a short diameter/long diameter of less than 0.6. All the particles were angular.

The pellets obtained above were subjected to injection molding at a resin temperature of 300° C. to make a column Ar-1 having a diameter of 5 mm and a height of 5 mm and plate Br-1 of 1 mm×100 mm×60 mm. Linear expansion coefficient of the column Ar-1 was measured by a thermo mechanical analyzer to obtain $2.6 \times 10^{-5}$ deg$^{-1}$. Among the twenty plates Br-1, five plates had shrink marks. The maximum height Rmax of the surface of the Br-1 was 1.35 µm at maximum and 0.78 µm at minimum on the whole surface of Br-1.

COMPARATIVE EXAMPLE 2

Pellets were molded in the same manner as in Example 1 except for using a crystalline soft silica (IMSIL A-108 manufactured by Tatsumori Co., Ltd. having an average particle diameter of 2.2 µm, ground type and non-sphere) as the filler. Melt index at 280° C. was measured in accordance with JIS K6719 to obtain 18 g/min.

In the same manner as in Example 1, a microphotograph of ×5000 of the filler was taken by a transmission type electron microscope. 40% or more of the particles had a short diameter/long diameter of less than 0.6. All the particles were angular.

The pellets obtained above were subjected to injection molding at a resin temperature of 300° C. to make a column Ar-2 having a diameter of 5 mm and a height of 5 mm and plate Br-2 of 1 mm×100 mm×60 mm. Linear expansion coefficient of the column Ar-2 was measured by a thermo mechanical analyzer to obtain $3.3 \times 10^{-5}$ deg$^{-1}$. Among the twenty plates Br-2, four plates had shrink marks. The maximum height Rmax of the surface of the Br-2 was 0.85 µm at maximum and 0.41 µm at minimum on the whole surface.

COMPARATIVE EXAMPLE 3

Pellets were molded in the same manner as in Example 1 except for using a glass fiber (Middle fiber MF06JB1-20 manufactured by Asahi Fiber Glass Co., Ltd. having a fiber diameter of 10 µm and an average fiber length of 100–300 µm) as the filler. Melt index at 280° C. was measured in accordance with JIS K6719 to obtain 15 g/min.

The pellets obtained above were subjected to injection molding at a resin temperature of 300° C. to make a column Ar-3 having a diameter of 5 mm and a height of 5 mm and plate Br-3 of 1 mm×100 mm×60 mm. Linear expansion coefficient of the column Ar-3 was measured by a thermo mechanical analyzer to obtain $3.3 \times 10^{-5}$ deg$^{-1}$. Among the twenty plates Br-3, fifteen plates had shrink marks. The maximum height Rmax of the surface of the Br-3 was 3.44 µm at maximum and 2.10 µm at minimum on the whole surface.

INDUSTRIAL APPLICABILITY

The resin compositions of the present invention have the characteristics of thermoplastic norbornene resins such as heat resistance, moisture resistance and chemical resistance, and are excellent in moldability and suitable for precision molding. Furthermore, the molded articles of the present invention obtained by molding the resin compositions are excellent in surface precision and dimensional stability and are small in volume change with change in temperature because of their small linear expansion coefficient and have excellent characteristics as precision molded articles.

We claim:

1. A resin composition which comprises 30–95 parts by weight of a thermoplastic norbornene resin having a number-average molecular weight of 10,000–200,000 and 5–70 parts by weight of a spherical inorganic filler having an average particle diameter of 0.05–50 µm.

2. A resin composition according to claim 1 which comprises 40–90 parts by weight of the thermoplastic norbornene resin and 60–10 parts by weight of the spherical inorganic filler.

3. A resin composition according to claim 2 which comprises 50–80 parts by weight of the thermoplastic norbornene resin and 50–20 parts by weight of the spherical inorganic filler.

4. A resin composition according to any one of claims 1–3, wherein the average particle diameter of the spherical inorganic filler is 0.1–10 µm.

5. A resin composition according to claim 4, wherein the average particle diameter of the spherical inorganic filler is 0.2–5 µm.

6. A resin composition according to any one of claims 1–3, wherein at least 70% by weight of the particles of the spherical inorganic filler have a particle diameter of ⅓–2 times the average particle diameter.

7. A resin composition according to claim 6, wherein at least 80% by weight of the particles of the spherical inorganic filler have a particle diameter of ⅓–2 times the average particle diameter.

8. A resin composition according to claim 7, wherein at least 85% by weight of the particles of the spherical inorganic filler have a particle diameter of ⅓–2 times the average particle diameter.

9. A resin composition according to claim 8, wherein at least 90% by weight of the particles of the spherical inorganic filler have a particle diameter of ⅓–2 times the average particle diameter.

10. A resin composition according to any one of claims 1–3, wherein the thermoplastic norbornene resin is a thermoplastic saturated norbornene resin.

11. A resin composition according to claim 10, wherein the thermoplastic saturated norbornene resin is an addition polymer of a norbornene monomer or an addition polymer of a norbornene monomer and an olefin.

12. A resin composition according to claim 10, wherein the thermoplastic saturated norbornene resin is a hydrogenation product of a ring opening polymer of a norbornene monomer.

13. A resin composition according to claim 12, wherein at least 90% of unsaturated bond in the main chain structure of the ring opening polymer of the norbornene monomer are saturated by hydrogenation.

14. A resin composition according to claim 13, wherein at least 95% of the unsaturated bonds in the main chain structure of the ring opening polymer of the norbornene monomer are saturated by hydrogenation.

15. A resin composition according to claim 14, wherein at least 99% of the unsaturated bonds in the main chain structure of the ring opening polymer of norbornene monomer are saturated by hydrogenation.

16. A molded article which comprises the resin composition according to any one of claims 1–3.

* * * * *